Figure 1:
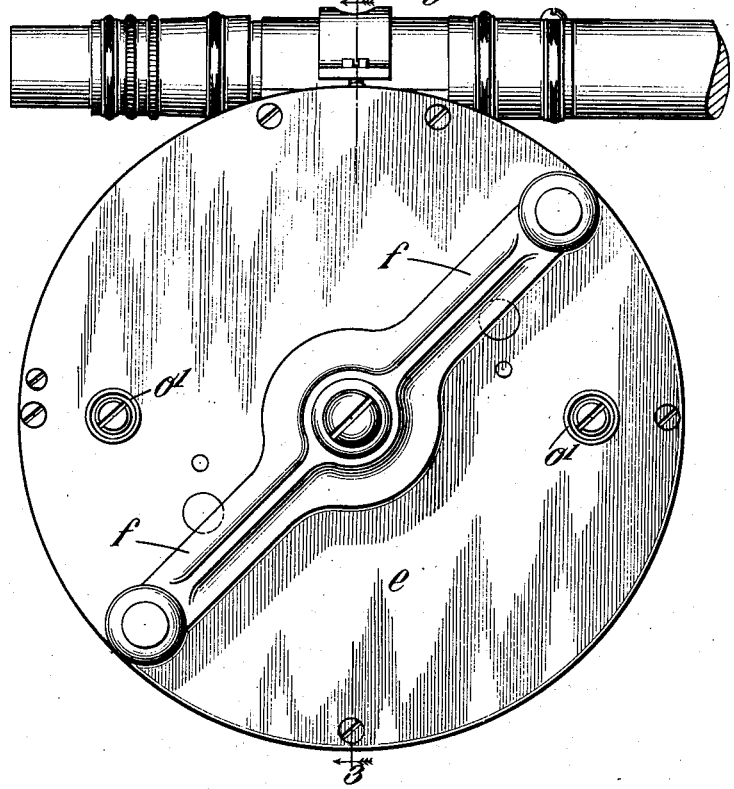

Nov. 18, 1930.  L. MITCHELL-HENRY  1,781,695
REEL FOR FISHING RODS AND THE LIKE
Filed July 27, 1928   4 Sheets-Sheet 1

Inventor:
LORENZO MITCHELL-HENRY
by Adolph E. Thomas
Attorney

Nov. 18, 1930.  L. MITCHELL-HENRY  1,781,695
REEL FOR FISHING RODS AND THE LIKE
Filed July 27, 1928  4 Sheets-Sheet 2
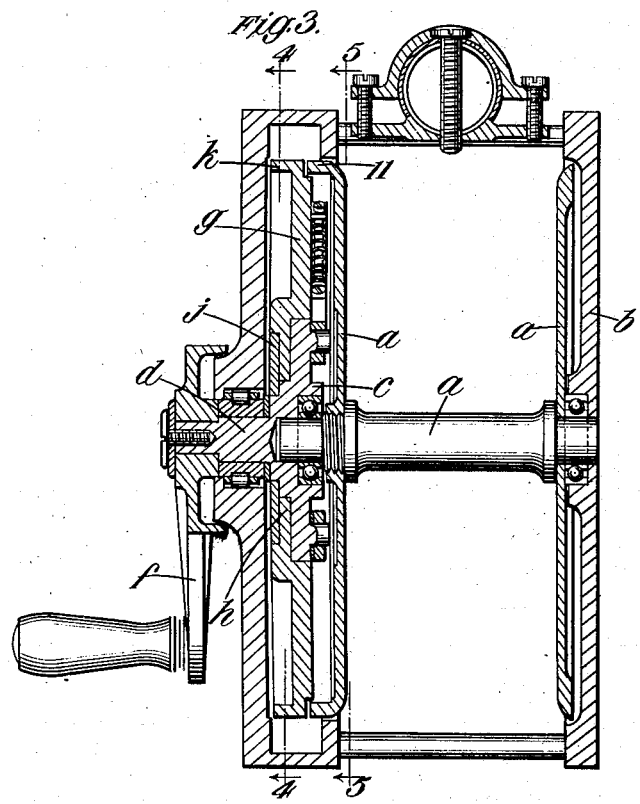
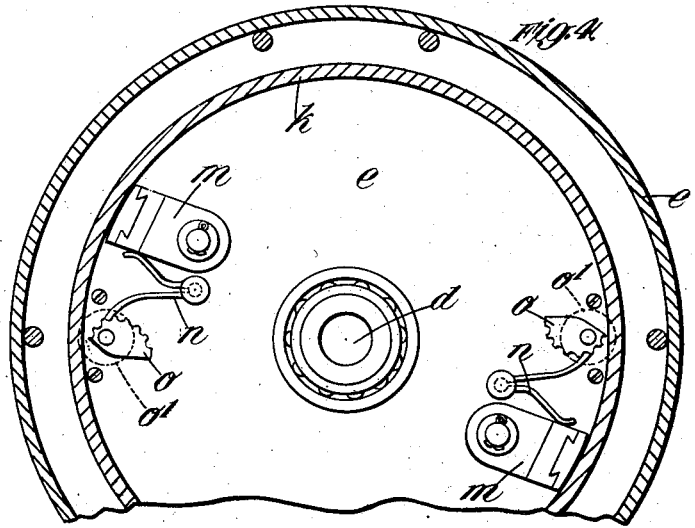
Inventor:
LORENZO MITCHELL-HENRY
by Adolph E. Thomas
Attorney Nov. 18, 1930.   L. MITCHELL-HENRY   1,781,695
REEL FOR FISHING RODS AND THE LIKE
Filed July 27, 1928   4 Sheets-Sheet 3
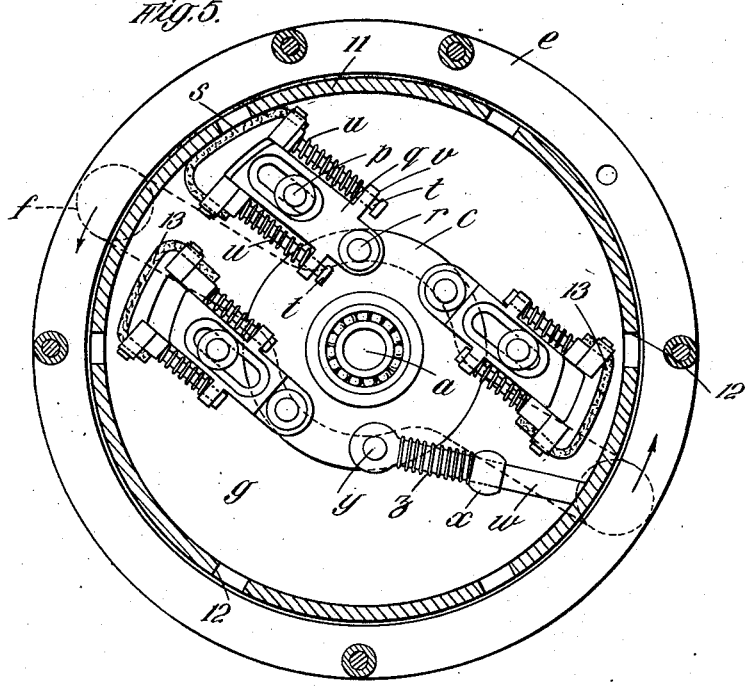
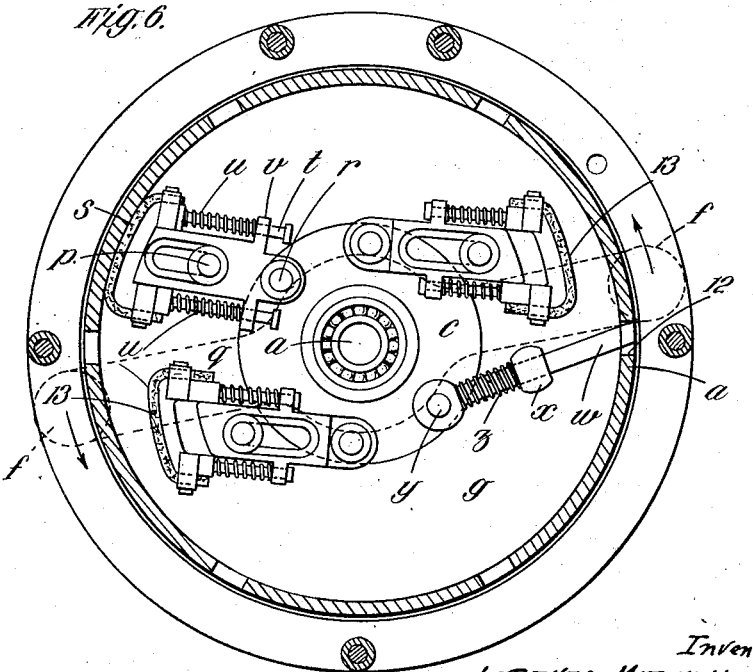
Inventor:
LORENZO MITCHELL-HENRY
by Adolph A. Thoma
Attorney Nov. 18, 1930.  L. MITCHELL-HENRY  1,781,695
REEL FOR FISHING RODS AND THE LIKE
Filed July 27, 1928  4 Sheets-Sheet 4

Inventor:
LORENZO MITCHELL-HENRY
by Adolph A. Thomas
Attorney

Patented Nov. 18, 1930

1,781,695

UNITED STATES PATENT OFFICE

LORENZO MITCHELL-HENRY, OF LONDON, ENGLAND

REEL FOR FISHING RODS AND THE LIKE

Application filed July 27, 1928, Serial No. 295,667, and in Great Britain August 15, 1927.

When using a rod and line for deep-sea and other heavy fishing it has been found necessary to employ some means for controlling the spool of the reel other than a mere handle on account of the violence of movement when playing a heavy, active fish and it has already been proposed to connect the handle with the reel by means of a slipping friction clutch controlled by a star wheel or the like, the handle proper being incapable of reverse rotation.

The object of the present invention is to provide improved means for connecting the handle with the spool whereby the movements of the latter may be more readily controlled.

According to the invention the handle of the reel is adapted to be connected with the spool through the medium of a floating plate or the like which carries the driving member or members of a clutch, the driven member of which rotates as one with, or forms part of, the spool, said floating plate or the like and the handle being connected together in such manner that relative motion between the handle and said plate or the like causes the clutch members to engage and connect the handle directly with the spool, and vice versa.

The spool may be mounted so as to be freely rotatable at its one end in one side of the supporting frame and at its other end in one end of a coaxial driving shaft which carries the handle.

Also mounted upon the driving shaft so as to be rotatable thereon there may be a floating plate which carries four brake shoes mounted one on each of four double ended levers the inner ends of which are formed with arcuate racks meshing with a pinion on the driving shaft, or are adapted to engage each with a rectangular notch formed in the edge of a disc fast on the driving shaft, and which are under the influence of springs tending normally to rock the brake shoes inwardly. One or more spring-pressed friction pads mounted on the shell or frame may be adapted to engage with the floating plate so as to retard or stop the rotation thereof.

That cheek of the spool adjacent to the handle may be formed with a peripheral flange constituting a drum on the inner side of which the four brake shoes are adapted to engage when rocked against the action of their springs.

The arrangement just described is such that whilst normally the spool is free to rotate and pay out its line without any tendency to rotate the handle, any positive movement of the handle in the direction of winding up the line rotates the pinion or notched disc relatively to the floating plate so as to tilt the brake shoes into engagement with the drum on the spool thus locking together the spool and driving shaft and enabling them to be rotated as one by means of the handle. When the pressure on the handle is released the brake shoes are withdrawn from engagement with the spool drum by means of their springs thus allowing the spool to run free. If desired, means may be provided for applying a graduated braking effect on the spool when the line is running out, and such means may be actuated either by reverse rotation of the winding handle or by means of a subsidiary lever or the like operated by said reverse rotation.

Figure 2:
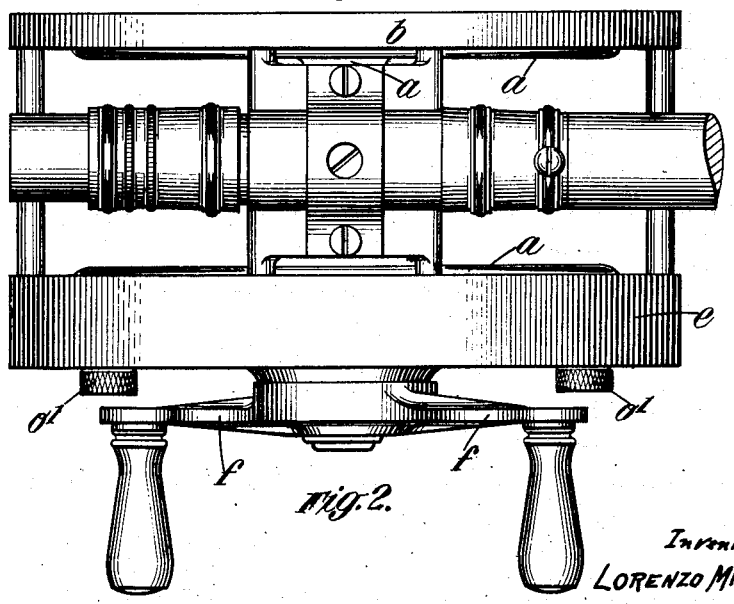

One form of the invention will be described with reference to the accompanying drawings of which Figures 1 and 2 are respectively a side elevation and a plan of a reel attached to the butt end of a rod; Figure 3 is a cross sectional elevation taken on the line 3—3 of Figure 1; Figure 4 is a sectional elevation taken on the line 4—4 of Figure 3; whilst Figures 5, 6, 7 and 8 are sectional elevations taken on the line 5—5 of Figure 3 but showing the parts in different operative positions.

As shown, the spool $a$ is mounted so as to be freely rotatable at its one end in one side $b$ of the supporting frame and at its other end, in a hollow extension $c$ of a coaxial driving shaft $d$ which is itself rotatable in the corresponding side $e$ of the frame, beyond which a double crank handle $f$ is mounted on said shaft $d$.

Within the casing constituted by the side $e$ of the frame a floating plate $g$ is mounted on the extension $c$ so as to lie in the same plane therewith and be angularly displaceable relatively thereto about their common axis, said floating plate $g$ having its inner peripheral margin $h$ held in position against said extension $c$ by a ring nut $j$ threaded on the boss of said extension, said floating plate $g$ having a circumferential flange $k$ extending towards the side $e$ of the frame.

On the inner face of the side $e$ of the frame are pivotally mounted two friction pads $m$ $m$ (Figure 4) adapted to be pressed by springs $n$ $n$ against the inner periphery of the flange $k$ of the floating plate $g$, the working faces of said pads being eccentric in respect to their pivotal axes, whilst eccentric abutments $o$, $o$ serve to enable the stress of the springs $n$, $n$, and consequently the degree of friction between said pads and said flange to be varied as desired, by rotation of external knurled knobs $o^1$ $o^1$.

On that face of the floating plate $g$ remote from the side $e$ is pivotally and slidably mounted, on a headed pin $p$ a slotted clutch block $q$ which is pivoted to a wrist pin $r$ on the extension $c$, and which carries at its outer end a clutch shoe $s$ by means of guide rods $t$ $t$, springs $u$, $u$ coiled around said rods $t$ $t$ abutting against the clutch shoe $s$ and against lugs $v$, $v$ at the opposite end of the clutch block $q$.

Similarly a clutch element $w$ is mounted to slide through a pivoted guide $x$ on the floating plate $g$ and is pivoted to a wrist pin $y$ on the extension $c$, a spring $z$ being coiled about said element $w$ and abutting against said guide $x$ and against an enlarged head on said element.

When the handle $f$ is turned in the direction to wind up line on the spool $a$ (counterclockwise in Figures 5, 6, 7 and 8) the torque tends to turn the floating plate $g$ but the frictional resistance offered by the pads $m$ $m$ causes said floating plate to lag behind the extension $c$; thus a thrust is exerted by the wrist pins $r$ and $y$ and the clutch shoe $s$ and the clutch element $w$ move outwards.

After a predetermined movement the clutch shoe $s$ engages frictionally the inner face of a peripheral flange 11 which extends from the adjacent cheek of the spool $a$ towards the side $e$ of the frame, with the result that the spool $a$ is driven by the handle $f$ through a friction clutch, as shown in Figure 5, from which it is to be observed that when such frictional clutching is established the springs $u$ $u$ are compressed slightly and the free end of the clutch element $w$ bears against the inner face of the peripheral flange 11, so that when not more than a predetermined slip has occurred between the clutch members the free end of the clutch element $w$ will be forced into one of a series of apertures 12 ... in said flange 11 and a positive drive will be obtained, as shown in Figure 6, from which it is to be observed that the springs $u$ $u$ are further compressed.

A slight reverse movement of the bundle $f$ (to an angular position relatively to the floating plate $g$, hereinafter called the neutral position) will declutch the spool $a$ which can then run free.

Figure 7:
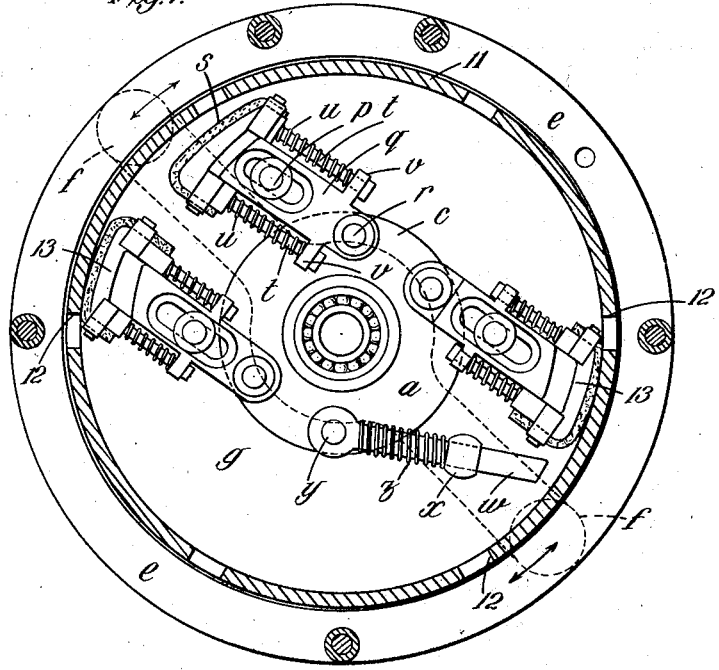
Figure 8:
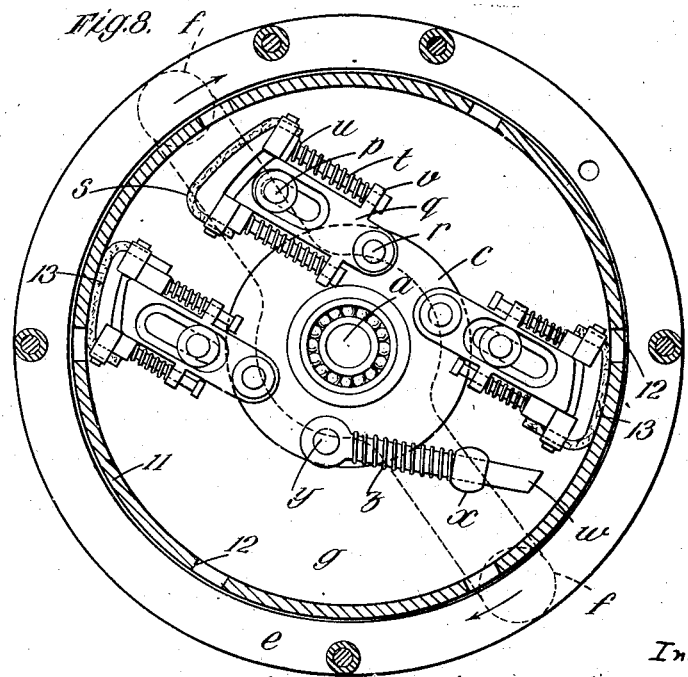

A pair of brake shoes 13, 13 mounted in a similar manner to the clutch shoe $s$ are arranged so that when the handle $f$ is moved in the reverse direction beyond the neutral position they are forced outwardly so as to engage the peripheral flange 11, as shown in Figure 7 and it is desirable that the spring $z$ of the clutch element $w$ should be such as automatically to move the parts to the position shown in Figure 7 when the handle $f$ is released and thus prevent the risk of an overrun of the spool. Further movement of the handle $f$ in said reverse direction (clockwise in Figures 5, 6, 7 and 8) will apply the brake fully, as shown in Figure 8, from which it is to be observed that the springs of the brake shoes 13, 13 are compressed. Any intermediate degree of braking effort can be applied by suitable positioning of the handle $f$.

Furthermore the construction is such that a braking effort can be exerted by turning the handle in the direction to wind up line on the spool provided care be taken that the handle is not turned so far as to cause the clutch element $w$ to be projected into one of the apertures 12 ....

It is to be understood that the friction and positive clutch elements and their method of operation are not restricted to the form illustrated but other elements and operating means may be substituted provided their actuation results from movement relatively to the floating plate of a part in one with the handle, the friction and positive drives being brought into use in sequence. Similarly the brake elements and their method of operation may be varied, whilst other forms of friction pads may be used to cause the floating plate to lag behind the handle, whilst the shape of the plate itself is not limited to that shown.

A reel made in accordance with this invention may be of compact and robust construction and whilst affording all the advantages of those at present in use, is much simpler to handle and consequently affords greater freedom in the use of the tackle.

If desired means such as a silent or other ratchet or similar device may be provided for making the floating plate $g$ unidirectional, or alternatively a clutch element similar to the clutch element $w$ may be provided on the opposite face of the floating plate $g$ and adapted to act reversely with respect to the element $w$ so as to be projected to engage stop means on the side $e$ of the frame.

Having now particularly described and ascertained the nature of my said invention and in what manner the same is to be performed, I declare that what I claim is:—

1. A reel for a fishing rod and the like comprising the combination of a rotary spool, a hand-operable driving shaft mounted in axial alignment with said spool, clutch mechanism interposed between said shaft and spool for frictionally connecting these parts, and a movable member operated by said shaft for positively connecting the latter to said spool independently of said clutch mechanism.

2. A reel for a fishing rod and the like comprising the combination of a spool, a shaft on which the spool is mounted for rotation, a driving shaft journalled in axial alignment with said spool shaft, a handle for operating said driving shaft, said two shafts being normally disconnected, and mechanism automatically operated by the forward rotation of said driving shaft for connecting the latter to said spool first by a frictional and then by a positive engagement.

3. A reel for a fishing rod and the like comprising the combination of a rotary spool provided with an annular lateral flange, a hand-operable driving shaft, a rotatable plate, an adjustable clutch device connected to said shaft and plate, said clutch device being movable by said shaft into locking engagement with said flange, whereby said shaft is frictionally connected to said spool, and means operable by said shaft for positively connecting the same to said spool independently of said clutch device.

4. A reel for a fishing rod and the like comprising the combination of a rotary spool provided with an annular lateral flange, a rotary disk, a handle connected to said disk for operating the same, a movable clutch device actuated by said disk to engage said flange for frictionally coupling the spool to the handle, a plate rotatably mounted on said disk and connected to said clutch device, and means for positively connecting the handle to said spool independently of said frictional connection when the handle is turned in a forward direction.

5. A reel for a fishing rod and the like comprising the combination of a rotary spool provided with an annular lateral flange, a rotary disk, a handle connected to said disk for operating the same, a movable clutch device actuated by said disk to engage said flange for frictionally coupling the spool to the handle, a plate rotatably mounted on said disk and connected to said clutch device, and a member mounted on said disk to move into direct locking engagement with said flange when the handle is turned in a forward direction, whereby the spool is positively connected to the operating handle independently of said clutch.

6. A reel for a fishing rod and the like comprising the combination of a rotary spool provided with an annular lateral flange, a rotary disk, a handle connected to said disk for operating the same, a movable clutch device actuated by said disk to engage said flange for frictionally coupling the spool to the handle, a plate rotatably mounted on said disk and connected to said clutch device, means for positively connecting the handle to said spool independently of said frictional connection when the handle is turned in a forward direction, and a separate clutch device for automatically connecting said spool and disk during the reverse movement of the handle.

7. A reel for a fishing rod and the like comprising the combination of a rotary spool, a hand-operable driving shaft, a rotatable plate, an adjustable clutch device connected to said shaft and plate, said clutch device being movable by said shaft into locking engagement with said spool, whereby said shaft is frictionally connected to said spool, means operable by said shaft for positively connecting the shaft to said spool independently of said clutch device, and friction pads carried by the reel for engaging said plate to retard the same when the handle is turned.

8. A reel for a fishing rod and the like comprising the combination of a rotary spool a hand-operable driving shaft, a rotatable plate, an adjustable clutch device connected to said shaft and plate, said cultch device being movable by said shaft into locking engagement with said spool, whereby said shaft is frictionally connected to said spool, means operable by said shaft for positively connecting the same to said spool independently of said clutch device, friction pads carried by the reel for engaging said plate to retard the same when the handle is turned, and means adjustable from outside the reel casing for regulating the frictional effect of said pads.

9. A reel for a fishing rod and the like comprising the combination of a rotary spool provided with an annular lateral flange, a rotary disk, a handle connected to said disk for operating the same, a movable clutch device actuated by said disk to engage said flange for frictionally coupling the spool to said handle, a plate rotatably mounted on said disk and connected to said clutch device, means for positively connecting the handle to said spool independently of said frictional connection when the handle is turned in a forward direction, and friction pads movable radially into engagement with said flange to retard the movement of said spool when the handle is turned.

10. A reel for a fishing rod and the like comprising the combination of a rotary spool provided with an annular lateral flange, a rotary disk, a handle connected to said disk for operating the same, a movable clutch device actuated by said disk to engage said flange for frictionally coupling the spool to said handle, said clutch device comprising a clutch block pivoted to said disk and slidably connected with said plate, a spring-pressed clutch shoe slidably mounted on said block and arranged to engage said flange, a plate rotatably mounted on said disk and connected to said clutch device, and means for positively connecting the handle to said spool independently of said frictional connection when said handle is turned in a forward direction.

Dated the 26th day of July, 1928.

LORENZO MITCHELL-HENRY.